(12) United States Patent
Louradour et al.

(10) Patent No.: US 10,191,343 B2
(45) Date of Patent: Jan. 29, 2019

(54) DEVICE AND PROCESS FOR FORMING LASER PULSES

(75) Inventors: Frederic Louradour, Eymoutiers (FR); Vincent Kermene, Aixe sur Vienne (FR); Alain Barthelemy, Limoges (FR); Eric Suran, Bersac S/Rivalier (FR); Tigran Mansuryan, Eerevan (AM)

(73) Assignee: Centre National de la Recherche Scientifique, Paris (FR)

( * ) Notice: Subject to any disclaimer, the term of this patent is extended or adjusted under 35 U.S.C. 154(b) by 448 days.

(21) Appl. No.: 13/510,232

(22) PCT Filed: Nov. 16, 2010

(86) PCT No.: PCT/FR2010/000768
§ 371 (c)(1),
(2), (4) Date: Jul. 6, 2012

(87) PCT Pub. No.: WO2011/061418
PCT Pub. Date: May 26, 2011

(65) Prior Publication Data
US 2012/0262772 A1 Oct. 18, 2012

(30) Foreign Application Priority Data
Nov. 17, 2009 (FR) .................................... 09 05514

(51) Int. Cl.
*G02B 26/00* (2006.01)
*G02F 1/01* (2006.01)
(Continued)

(52) U.S. Cl.
CPC ...... *G02F 1/136277* (2013.01); *H01S 3/0057* (2013.01); *G02F 2203/12* (2013.01); *G02F 2203/26* (2013.01); *G02F 2203/50* (2013.01)

(58) Field of Classification Search
CPC ............ G02F 1/136277; G02F 1/1313; G02F 1/0311; G02F 2203/26; G02F 2203/54;
(Continued)

(56) References Cited

U.S. PATENT DOCUMENTS 5,682,262 A 10/1997 Wefers et al.
6,577,782 B1 * 6/2003 Leaird ................ G02B 6/12011
385/15
(Continued)

OTHER PUBLICATIONS

Bock et. al.; "Spectral and temporal response of liquid-crystal-on-silicon spatial light modulators," Applied Physics Letters; dated Apr. 15, 2008.
(Continued)

*Primary Examiner* — Mustak Choudhury
(74) *Attorney, Agent, or Firm* — Alston & Bird LLP (57) ABSTRACT

The invention relates to a device for forming laser pulses comprising: an input for a pulsed laser beam; a spatial phase modulator (300), arranged on the trajectory of said pulsed laser beam so as to be illuminated thereby; a control means designed to configure said spatial phase modulator so as to emulate a diffraction grating (3, 3') having a diffraction efficiency that varies along one spatial direction (s) identified by the intersection of the modulator surface with the diffraction plane (xz); and spatial filtering means (5) for a light beam diffracted by said grating; whereby a laser pulse ($P_1$) at the device input is converted to a train of elementary output pulses (PS) having temporal intensity and/or phase and/or polarization modulation. The invention further relates to a laser pulse forming process based on the use of such a device.

13 Claims, 3 Drawing Sheets

(51) Int. Cl.
*G02F 1/1362* (2006.01)
*H01S 3/00* (2006.01)

(58) Field of Classification Search
CPC ............ G02B 6/12011; G02B 6/12014; H01S 3/0057; H01S 3/1024; G03H 1/08; G03H 1/2205; G03H 1/2294; H03K 3/42; H03K 3/64; H03K 3/70; H03K 3/78; H03K 3/84; H03K 3/86; H03K 4/43; H03K 4/64; H03K 4/72; H03K 4/625; H04B 10/508
USPC ............ 359/238, 264, 279; 372/50.11, 50.12
See application file for complete search history.

(56) References Cited

U.S. PATENT DOCUMENTS

2001/0040723 A1 11/2001 Kusaka
2006/0017999 A1* 1/2006 Vaughan ............... H01S 3/0057
359/237

OTHER PUBLICATIONS

Brixner et. al.; "Femtosecond polarization pulse shaping," Optics Letters; vol. 26, No. 8, dated Apr. 15, 2001.
Emplit et. al.; "Passive amplitude and phase picosecond pulse shaping," Optics Letters; vol. 17, No. 19; dated Oct. 1, 1992.
Froehly et. al.; "Shaping and Analysis of Picosecond Light Pulses," Progress in Optics; vol. 20; dated 1983.
Tournois, "Acousto-optic programmable dispersice filter for adaptive compensation of group delay time dispersion in laser systems," Optics Communications; vol. 140; dated Aug. 1, 1997.
International Search Report and Written Opinion for Application No. PCT/FR2010/000768 dated Mar. 18, 2011.
Bock, M. et al., *Spectral and Temporal Response Liquid-Crystal-On-Silicon Spatial Light Modulators*, Applied Physics Letters, 92, (2008) pp. 151105-1-151105-3.
Emplit, Ph. Et al., *Passive Amplitude and Phase Picosecond Pulse Shaping*, Optics Letters, vol. 17, No. 19, Oct. 1992, 3 pages.
Froehly, C. et al., *Shaping and Analysis of Picosecond Light Pulses*, E. Wolf, Progress in Optics XX © North-Holland 1983, 65-153.
Brixner, T. et al., *Femtosecond Polarization Pulse Shaping*, Optics Letters, vol. 26, No. 8 (2001) 557-559.
Tournois, P., *Acousto-Optic Programmable Dispersive Filter for Adaptive Compensation of Group Delay Time Dispersion in Laser Systems*, Opt. Commun. 140 (1997) 245-249.

* cited by examiner

DEVICE AND PROCESS FOR FORMING LASER PULSES

FIELD

The invention relates to a device and a method for shaping laser pulses. More particularly, the invention relates to a device and a method that make it possible to convert an input laser beam, typically having a duration of between a few femtoseconds (1 fs=$10^{-15}$ s) and a few picoseconds (1 ps=$10^{-12}$ s), into a train of replicas of said pulse, modulated in amplitude and possibly in phase and/or in polarization.

The invention lends itself to many applications, particularly scientific: time-resolved study of photochemical and photophysical processes, characterization and/or machining of materials, consistent control of chemical reactions, generation of terahertz or x radiation, metrology, etc.

BACKGROUND

The lasers that operate in phase locked mode deliver pulses whose duration may be as short as 10 fs, even less. These pulses generally have an approximately gaussian time envelope, possibly with mainly linear or quadratic phase modulation.

In many applications, there is a need for longer and sub-structured pulses; for example, there may be a desire to generate a complex picosecond pulse consisting of a train of individual femtosecond pulses, modulated in amplitude and/ or in phase and/or in polarization.

To meet this need, many laser pulse shaping techniques have been developed. The most commonly used are filtering in the Fourier plane and acousto-optic temporal modulation.

The technique of filtering in the Fourier plane is described, in particular, by the document U.S. Pat. No. 5,682,262. In such a device, a first diffraction grating (or prism) disperses the various spectral components of an input pulsed laser beam. These spectral components are focused by a cylindrical lens so as to form a two-dimensional optical field which is projected onto a programmable amplitude and phase mask. This mask makes it possible to selectively attenuate and phase-shift each component, so as to modify the spectrum of the input pulses in a predetermined manner. A second cylindrical lens and a second grating or prism recombine the filtered spectral components, to form a temporally structured pulsed laser beam at the output.

This method is extremely flexible, but does have a certain number of drawbacks:
  it is complex to implement;
  the method introduces space-time aberrations; this means that the temporal profile of the output pulsed beam varies spatially in a direction transversal to the direction of propagation; these space-time aberrations become particularly detrimental if the output pulsed beam is required to be strongly focused (nonlinear microscopy applications, for example);
  the phase mask is pixelated, and necessarily includes opaque interstitial areas between the pixels that diffract the light; this is reflected in the appearance of temporal replicas of the output pulses;
  to obtain a predetermined output temporal profile, it is necessary to accurately know the spectrum of the input pulse, as well as its spectral phase, and perform relatively complex computations; it may even be necessary to use iterative optimization techniques (genetic algorithms, in particular) whose convergence can be slow, even random.

The article by T. Brixner and G. Gerber entitled "Femtosecond polarization pulse shaping", Optics Letters, Vol. 26, no. 8, pages 557-559, 15 Apr. 2001, describes a variant of the technique of filtering in the Fourier plane that makes it possible to modulate the polarization of a pulse. The technique is based on the use of a spatial filter consisting of a double-layer pneumatic liquid crystal modulator.

Another shaping technique known from the prior art is based on the use of an acousto-optic modulator. Such a device is described, for example, by the article by P. Tournois: "Acousto-optic programmable dispersive filter for adaptive compensation of group delay time dispersion in laser systems", Opt. Commun. 140, 245-249 (1997), and marketed by the company "Fastlite" under the tradename "Dazzler". This device is based on the interaction, inside a birefringent crystal, of a laser pulse and an acoustic wave. Its main drawback, linked to the use of an acoustic wave, is its low rate of operation, a few kHz at most, whereas phase locked laser oscillators emit pulses at a rate of several MHz.

Yet another technique for shaping laser beams is direct space-to-time shaping (DST), described by the article by C. Froehly, B. Colombeau and M. Vampouille "Shaping and analysis of picosecond light pulses", in "Progress in Optics XX", North Holland 1983, pages 112-115. This technique is particularly simple. It consists in directing an input pulsed laser beam onto a diffraction grating, preferably "blazed" or "echelle". The beam diffracted to the first order (or to a higher order) is spatially filtered. It is possible to demonstrate that, after the spatial filtering, each pulse of the input beam is converted into a composite output pulse, formed by a train of individual pulses. The number of individual pulses forming each composite pulse is equal to the number of lines of the grating which are illuminated by the input beam; the total duration of the composite pulse is equal to $2l/c$, in which l is the length of the projection of the grating onto the propagation axis of the input beam and c is the speed of light.

A temporal modulation of the intensity of each composite pulse, or train of individual pulses, is obtained by having, in front of the grating, an opaque screen in which an opening has been cut, the shape of which corresponds to the desired temporal modulation. This screen makes it possible to adjust the length of each line of the grating (measured perpendicularly to the plane of dispersion), and consequently the energy of each individual pulse of the output beam.

This technique is very simple to implement, but not very flexible: for each desired temporal profile, it is necessary to produce a new mask by cutting an opaque screen.

The document U.S. Pat. No. 6,577,782 discloses a refinement of the direct space-time shaping technique in which the opaque mask arranged in front of the grating is replaced by a programmable amplitude modulator, illuminated by the input beam and imaged on the diffraction grating. This assembly makes it possible to dynamically modify the temporal profile of the composite pulses, but is much more complex than the one initially proposed by C. Froehly and collaborators. Furthermore, neither of the two known variants of the direct space-time shaping technique makes it possible to modulate the phase and/or the polarization of the individual pulses, in addition to their amplitude.

The invention aims to remedy the above-mentioned drawbacks of the prior art.

SUMMARY

According to the invention, such an aim is achieved by a device for shaping laser pulses comprising:
- an input for a pulsed laser beam;
- a spatial phase modulator, arranged on the path of said pulsed laser beam to be illuminated thereby;
- a control means adapted for configuring said spatial phase modulator so as to emulate a diffraction grating having a diffraction efficiency which varies along a spatial direction identified by the intersection of the surface of the modulator with the diffraction plane; and
- a spatial filtering means for a light beam diffracted by said grating;
- whereby a laser pulse at the input of the device is converted into a train of individual output pulses exhibiting a temporal intensity and/or phase and/or polarization modulation.

The input of the device can be embodied by an opening in a housing containing said device, by a diaphragm, by an input lens, etc. The term "surface" of the spatial phase modulator should be understood to mean the active surface of said modulator, illuminated by the beam and suitable to modify its phase.

The invention offers a number of differences relative to the direct space-time shaping techniques known from the prior art:
- the "conventional" diffraction grating, etched or holographic for example, is replaced by a programmable spatial phase modulator which allows for the temporal profile of the output pulses to be dynamically modified;
- a single element, the spatial phase modulator, replaces the diffraction grating and the amplitude mask/opaque screen of the prior art techniques described above;
- the use of a phase modulator—without mask or amplitude modulator—makes it possible to modify both the amplitude and the phase or even the polarization of the individual output pulses. On the other hand, the use of a mask or amplitude modulator, known from the prior art, does not make it possible to act on the phase of the output pulses.

According to different embodiments of the inventive device:
- Said phase modulator may be a pure phase modulator, that is to say, not suitable to also introduce an amplitude modulation.
- Said diffraction grating may be a blazed (or "echelle") grating having lines whose blaze angle varies along said spatial direction.
- At least some of said lines may have, relative to a periodic arrangement, an offset in the diffraction plane of the grating introducing a phase shift of the corresponding individual pulses. This offset can be made both in said spatial direction and in a direction perpendicular to the plane of the grating.
- The device may also comprise a means for splitting the input pulsed laser beam into two input beams that are spatially separate and exhibit orthogonal (notably linear) polarization states, in which said control means is adapted for configuring said spatial phase modulator so as to emulate two distinct diffraction gratings having diffraction efficiencies which vary, independently of one another, along said spatial direction, each of said gratings being illuminated by one of said two input beams. Advantageously, such a device may also comprise a means for recombining two output beams exhibiting orthogonal (notably linear) polarization states, diffracted by said two diffraction gratings.
- Said spatial phase modulator preferably operates in reflection mode. In this case, when said control means can be adapted for configuring said spatial phase modulator so as to emulate a blazed diffraction grating, the spatial phase modulator may be oriented in such a way that said blazed grating is in Littrow configuration; a beam splitter is therefore provided to extract the beam diffracted by said modulator, being propagated back toward said input.
- Said spatial filtering means may comprise a means for focusing a light beam diffracted by said spatial phase modulator, having a focal plane; and a slot, arranged in said focal plane and oriented perpendicularly to said spatial direction. More particularly, the focusing means can be chosen from a lens and the spatial phase modulator itself, which may be responsible for imposing the appropriate spherical mean phase shift.
- The device may comprise a telescope for enlarging said pulsed beam, arranged between the input and the spatial phase modulator, making it possible to adjust the size of the beam to that of the modulator.

According to a particular embodiment of the invention:
- said telescope may comprise a first and a second convergent lens;
- said diffraction grating may be a blazed grating operating in reflection mode and oriented so as to be in Littrow configuration;
- a beam splitter may be provided to extract the beam diffracted by said modulator, being propagated back toward said input, after the latter has passed a second time through said second convergent lens; and
- a slot, oriented perpendicularly to said spatial direction, may be arranged on the path of the beam extracted by said splitter, in the focal plane of said second lens, to form said spatial filter.

Another subject of the invention is a method for shaping laser pulses comprising the steps consisting in:
- configuring a spatial phase modulator so as to emulate a diffraction grating having a diffraction efficiency which varies along a spatial direction identified by the intersection of the surface of the modulator with the diffraction plane;
- directing a pulsed laser beam onto said spatial phase modulator; and
- spatially filtering a light beam diffracted by said grating; whereby a laser pulse at the input of the device is converted into a train of individual output pulses exhibiting a temporal intensity modulation.

According to different embodiments of the inventive method:
- said spatial phase modulator may be configured so as to emulate a blazed diffraction grating, having lines of triangular section whose blaze angle varies along said spatial direction.
- At least some of said lines may exhibit, relative to a periodic arrangement, an offset in the diffraction plane of the grating introducing a phase shift of the corresponding individual pulses. This phase shift may be made both in said spatial direction and in a direction perpendicular to the plane of the grating.
- The method may also comprise a step consisting in splitting the input pulsed laser beam into two input beams that are spatially separate and that exhibit orthogonal (notably linear) polarization states, and in which, in said configuration step, said spatial phase modulator is configured so as to emulate two distinct diffraction gratings having diffraction efficiencies which vary, independently of one another, along said spatial direction, each of said gratings being illuminated by one of said two input beams. Advantageously, such a method may also comprise a step consisting in recombining two output beams exhibiting orthogonal (notably linear) polarization states, diffracted by said two diffraction gratings.

Said diffraction grating may operate in reflection mode and, more particularly, may be a blazed grating oriented so as to be in Littrow configuration.

BRIEF DESCRIPTION OF THE DRAWINGS

Other features, details and advantages of the invention will become apparent from reading the description given with reference to the appended drawings given by way of example and which represent, respectively.

DETAILED DESCRIPTION

Figure 1A:
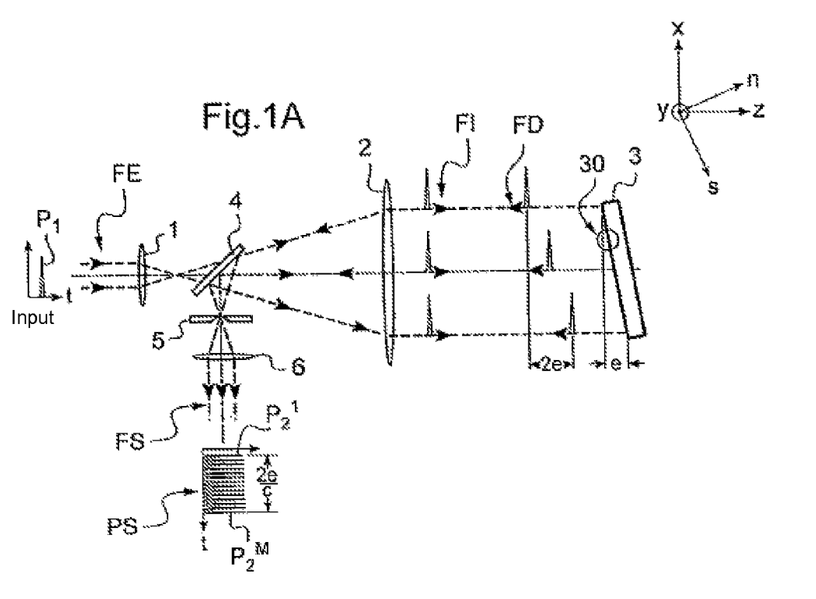
FIG. 1A, the diagram of a direct space-time shaping device known from the prior art.

The device of FIG. 1A comprises two convergent lenses 1 and 2 forming a beam-expanding telescope. This telescope expands a input pulsed laser beam FE to adapt it to the dimensions of a diffraction grating 3, and directs it toward the surface of this grating.

The grating 3 is a "blazed" or "echelle" type grating, operating in reflection mode and oriented so as to be in Littrow configuration.

A blazed grating is a planar diffraction grating which has the property of concentrating a large portion of the incident optical flux in the 1st order of diffraction (or, more generally, in an order N, with N≠0) when the corresponding diffraction angle is equal to a predetermined angle called "blaze angle".

Figure 1B:
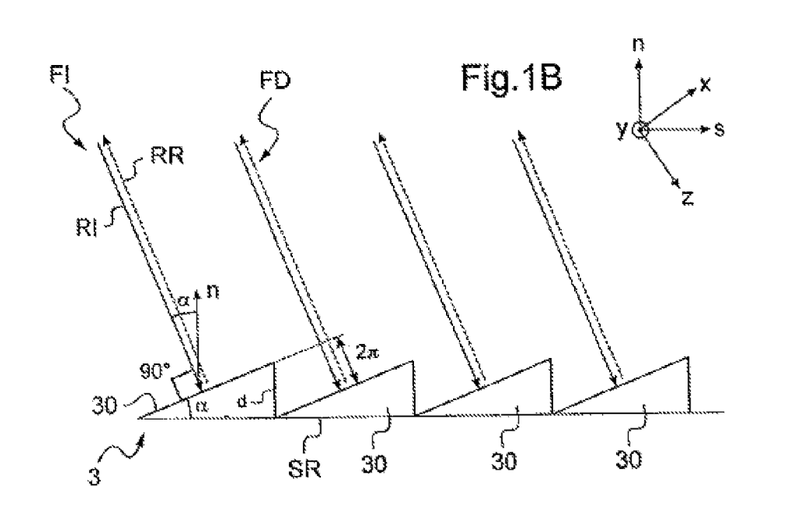
FIG. 1B, a diagram illustrating the structure of a blazed grating and the Littrow configuration concept.

Typically, a blazed grating operates in reflection mode (even though transmission mode blazed gratings also exist) and has an "echelle" structure schematically illustrated in FIG. 1B.

The grating of FIG. 1B comprises M lines, of depth d, which have a sawtooth section and thus form a series of planar facets 30, inclined by an angle α relative to the plane of the grating. The result of this is a surface of the grating in ladder form, hence the name "echelle grating". Intuitively, it will be understood that the diffraction efficiency of the grating is maximum when the diffraction angle to the 1st order (or possibly to a higher order) is equal to the angle of reflection of the incident light beam by the individual planar facets, which thus behave like micro-mirrors.

More specifically, FIG. 1B shows a blazed grating in "Littrow" configuration. In this configuration, an incident light beam FI forms an angle equal to α with the normal n to the surface SR of the grating. This means that the planar facets are oriented perpendicularly to said incident beam FI. Thus, each facet 30 is illuminated in normal incidence by a ray RI of said beam, and reflects it backward (ray RR, represented by a dotted line) according to the laws of geometrical optics. Furthermore, in order to be able to talk of "Littrow configuration", it is necessary for the rays RR reflected by the different facets to constructively interfere with one another to form a diffracted beam FD. This condition is satisfied when $2d\cos(\alpha)=N\lambda$ with N being an integer, $\lambda$ being the wavelength of the incident beam, assumed monochromatic. This means that the periodicity of the grating has to be such that its diffraction angle to the order ±N is equal to ±α.

In FIGS. 1A and 1B, z is used to indicate the direction of propagation of the incident and diffracted beams, y is used to indicate the direction of orientation of the lines of the grating, x is used to indicate the direction perpendicular to y and to z, s is used to indicate the direction identified by the intersection between the surface of the grating and the diffraction plane (plane xz) and n is used to indicate the normal to the surface SR of the grating.

FIG. 1A shows that the incident beam FI, expanded by the telescope 1, 2 so as to illuminate M individual facets of the grating 3, is diffracted thereby, and the diffracted beam FD is propagated back toward the lens 2, that is to say along the direction −z.

Consider the case where the input light beam FI is a pulsed beam, consisting of a succession of pulses $P_1$ of duration T of the order of a few picoseconds to a few femtoseconds. The interval between two input pulses is very much greater (3 to 6 orders of magnitude) than T. Consequently, the rest of the description will be limited to considering an isolated input pulse $P_1$.

In FIG. 1A, it can be seen that, after diffraction by the grating 3, each input pulse is subdivided into M individual pulses $P_2^1$-$P_2^M$, shifted spatially in the direction z and temporally. The delay between two successive pulses corresponds to the optical path difference between the rays reflected by two adjacent individual facets 30, and is therefore $$\Delta t = \frac{2d\cos\alpha}{c}.$$

The diffracted beam, consisting of these spatially and temporally shifted individual pulses, is focused by the lens 2 of the input telescope. Then, it is extracted from said telescope by a splitter plate 4 and sent to a slot 5, situated in a focal plane of said lens 2 and oriented in the direction y.

As a variant, the splitter plate 4 can be replaced with a cut mirror placed below (or above) the incident beam. For this, a small angle (a few degrees) must be introduced between the normal to the grating and the plane of the figure; thus, the reflected beam no longer belongs exactly to the plane of the figure; the incident beam and the reflected beam are then slightly separated spatially in the vicinity of the cut mirror; the edge thereof is just below the incident beam and just above the reflected beam that it intercepts (or vice versa).

The slot 5 produces a spatial (low-pass) filtering of the diffracted beam to homogenize its spatial profile. The duly obtained filtered beam is then collimated by a lens 6 arranged so as to form, with the lens 2, an output telescope. It is possible to demonstrate that the output beam FS exhibits a temporal profile consisting of a train of M individual pulses whose total duration is $$T = M \cdot \Delta t = \frac{2dM\cos\alpha}{c} = \frac{2e}{c}$$

in which e=dM cos α is the length of the projection of the grating 3 (or, more generally, of the portion of the grating which is effectively illuminated by the beam FI) on the axis z.

In the example illustrated in FIG. 1A, the duration T of each individual pulse $P_2^i$ (i=1-M) is less than the interval Δt between two pulses; consequently, the composite output pulse PS takes the form of a train of pulses separated from one another. It will be noted that the condition Δt>τ implies 2d cos α>>λ, and therefore a high order of diffraction. To obtain time-resolved output pulses when operating at the first order of diffraction (or more generally at a low order), it is possible to mask one or more individual facets of the grating to create a non-reflecting region to which corresponds, in the time domain, an interval characterized by a zero optical intensity separating two output pulses.

If, on the other hand, T>Δt (the most usual case), then the individual pulses are merged in the output pulse. The expressions "composite pulses" and "train of individual pulses" will be used interchangeably to indicate both a succession of well-resolved individual pulses and a succession of pulses that are partially superposed such that they can no longer be distinguished.

In the example illustrated in FIG. 1A, all the individual output pulses have the same energy. This presupposes that the M individual facets of the grating 3 receive—and reflect—a same light flux. In a more general case, the illumination of the grating by the incident beam is not perfectly uniform and this introduces a variation of energy between the different individual pulses.

The article mentioned above by C. Froehly et al. proposes adjusting the energy of each individual pulse by using an opaque screen having an opening. This screen masks each line of the grating 3 over a portion of its length (measured along the direction y). The greater the masked fraction of the surface of the ith line, the lower the energy of the individual pulse $P_2^1$. As explained above, this solution is penalized by its lack of flexibility.

In order to remedy this drawback, the above-mentioned document U.S. Pat. No. 6,577,782 proposes adjusting the energy of the individual pulses by modifying the transverse profile of the incident beam FI by using a spatial amplitude modulator. This solution leads to a complex assembly, and in any case it does not make it possible to modulate the phase of the composite output pulse.

One idea on which the invention is based consists in replacing the diffraction grating 3 with a programmable spatial phase modulator, configured so as to emulate a diffraction grating whose diffraction efficiency varies spatially in the direction s. This spatial variation of efficiency is reflected in a variation of energy of the individual pulses of the diffracted beam, and therefore in a modulation of the temporal profile of the composite output pulse, and without the need to use an opaque screen or a spatial amplitude modulator. The programmable or reconfigurable nature of the phase modulator makes it possible to dynamically modify the properties of the emulated grating, and consequently the temporal profile of the composite output pulse.

Figure 3:
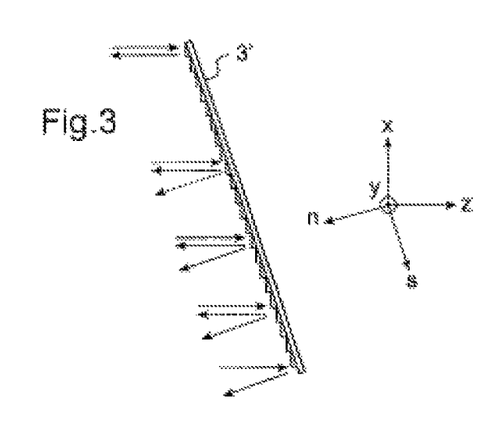
FIG. 3, a side view of a blazed diffraction grating in which the blaze angle varies spatially.

FIG. 3 shows an echelle grating 3' in which the angle $\alpha^i$ formed by each individual facet 30$^i$ with the surface of the grating reduces along the direction s: $\alpha^1 > \alpha^2 > \ldots > \alpha^M$. The normal to the grating forms an angle $\alpha^1$ with an incident light beam FI assumed to be monochromatic, of wavelength λ. Furthermore, the periodicity of the grating is such that the angle of diffraction to the order N≠0 of said beam is equal to $\alpha^1$. In these conditions, the first individual facet efficiently diffracts back the incident light, exactly as in a blazed grating in Littrow configuration. However, the other facets have a non-optimal inclination $\alpha^i$, and consequently a diffraction efficiency to the first order that is increasingly low.

Figure 2:
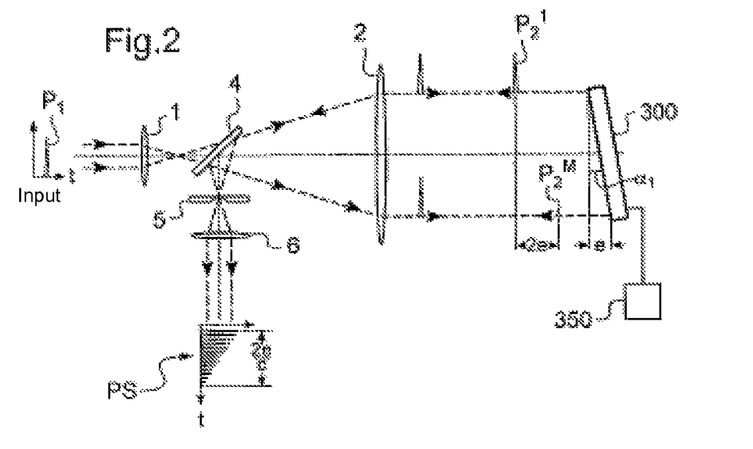
FIG. 2, the diagram of a device according to a first embodiment of the invention.

The device of FIG. 2 uses a spatial phase modulator 300 configured, using the computer 350, to emulate the echelle grating 3' with variable diffraction efficiency. As can be seen in the figure, this device makes it possible to obtain a composite output pulse in the form of a train of individual pulses $P_2^i$ of decreasing intensity.

Figure 4:
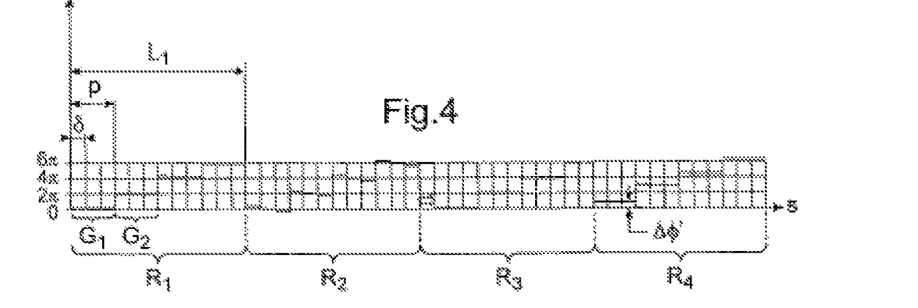
FIG. 4, a schematic representation of a portion of a phase modulator used according to the invention.

FIG. 4 shows how, physically, a phase modulator can be configured so as to emulate a blazed grating. In a conventional echelle grating, each individual facet, inclined by an angle $\alpha^i$, reflects the incident light and introduces a phase shift Δφ which varies linearly along the direction s between 0 and 2π radians (or, more generally, 2Nπ, with N being an integer). In a grating with variable diffraction efficiency, like the grating 3' of FIG. 3, the maximum phase shift introduced by a facet may be less than 2π radians.

The programmable phase modulator 300 consists of pixels organized along rows (parallel to the axis y) and columns (along the direction s). Each group $G_i$ of, for example, three rows is intended to emulate one facet of the grating 3.

FIG. 4 shows the phase shift Δφ), measured on a round trip, on the optical path defined by the Littrow condition (inverse return) which is imposed on the one hand by the liquid crystal matrix and on the other hand by the effect of inclination of the plane of the matrix (angle α); the matrix, by itself, introduces phase shifts of between 0 and 2π radians, which are superposed on the linear phase shift introduced by the inclination effect. The pixels of the matrix have a constant size equal to δ. The pixels of a same column (direction y) are in the same state. The columns are grouped together in packets (3 columns of pixels for each packet in the example of FIG. 4). A packet forms a pattern, or line, of a local diffraction grating $L_i$ of size $L_i$. The size of a pattern, which is also equal to the pitch of the periodic grating, is constant and its value is indicated by "p". Unlike what is represented in FIG. 4, the length $L_i$ of the local grating $R_i$ is suitable to vary in the direction s. The $R_i$ are pure phase diffraction gratings of echelle type. Compared to a standard echelle grating, the variation of phase along a pattern in the direction s is not continuous. It varies discretely because of the pixelated structure of the matrix. This discretization affects the energy efficiency of the gratings without compromising their coherent behavior which is described below. The set of the gratings Ri forms a resultant non-uniform grating ($R_i \neq R_j$) covering all the matrix. FIG. 4 presents 4 local gratings ($R_i$, i=1 to 4) for 4 different states of amplitude and phase modulation of the diffracted wave: respectively, reference amplitude and phase, modulated amplitude and reference phase, reference amplitude and phase modulated by transverse shift of the local grating, reference amplitude and phase modulated by "phase piston" (shift along the axis z, addition of a constant phase).

The grating $R_1$ emulates a blazed grating in Littrow configuration; the rows of each group $G_i$ introduce a constant phase shift, which corresponds to a maximum diffraction efficiency in the order of diffraction used. The phase of the wave diffracted by this grating is chosen arbitrarily as origin of the phases. The phase of the wave diffracted by the grating $R_2$ is identical to the preceding one.

In the local grating $R_2$, the rows of each group $G_i$ introduce a phase shift which is no longer constant but varies linearly. These groups thus emulate blazed grating facets which are not perfectly oriented in the Littrow direction such that the diffraction efficiency of the grating in that direction is reduced, which makes it possible to modulate the amplitude of the diffracted wave.

The local gratings $R_3$ and $R_4$ have a maximum diffraction efficiency, like the grating $R_1$.

The grating $R_3$ is in fact identical to the grating $R_1$, except in that its patterns are translated by one pixel to the right (the rightmost portion of the fourth pattern is transferred to the left: it is therefore a circular shift). This introduces a phase shift of the diffracted wave, in the case in point by $\Delta\varphi=2\pi/3$ rad. A shift of two pixels would introduce a phase shift of $4\pi/3$, and a shift of three pixels would have no effect. The phase control dynamic is therefore equal to the number of pixels per pattern of the grating.

The configuration of $R_4$ is identical to that of the reference grating $R_1$, except in that a constant phase shift $\Delta\varphi'$ has been added to each pixel ("phase piston"), which directly affects the phase of the wave diffracted by this grating.

Figure 6A:
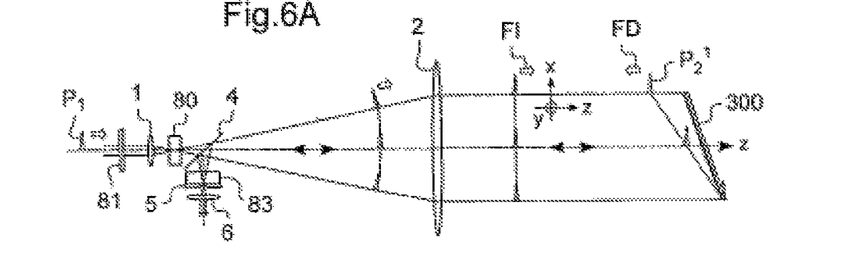
FIGS. 6A, 6B and 6C, a device according to a third embodiment of the invention.
Figure 6B:
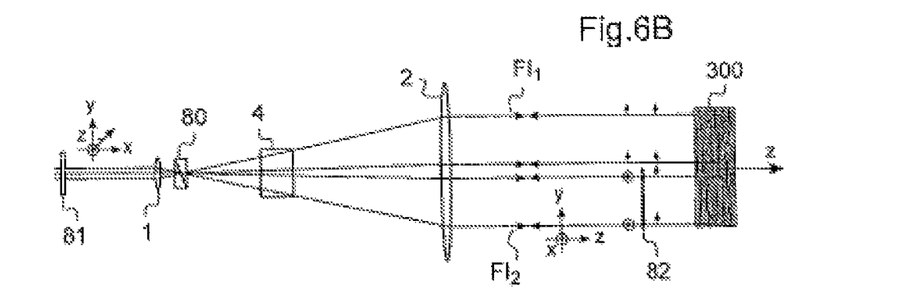

FIGS. 6A and 6B show, respectively by top view and side view, a device according to one embodiment of the invention that makes it possible to modulate the polarization of the input laser pulses. Such a device is differentiated from that of FIG. 2 essentially in that a (first) birefringent component (Wollaston prism) 80 is arranged at the focus common to the lenses 1 and 2; and
Optionally, furthermore:
  a first half-wave phase plate 81 may be situated at the input of the device, upstream of the lens 1;
  a second half-wave phase plate 82 may be positioned before a half (in the direction y) of the phase modulator 300; and
  a second birefringent Wollaston prism 83 may be arranged just before the output slot 5.

Advantageously, the Wollaston prism(s) has/have a small angle (a few degrees, typically 1 to 5°, preferably approximately 2°) and a small thickness (typically 1 to mm, for example 2 mm). The second prism 83, if present, should preferably be symmetrical to the first.

The birefringent prism 80 splits the incident beam in the plane orthogonal to the plane of dispersion into two orthogonally polarized beams that are propagated in two different directions. The half-wave phase plate 81, positioned at the input, makes it possible to adjust the amplitude of the two beams from the prism by modifying the direction of linear polarization of the beam at the input (vector E in FIG. 6B). After the lens 2, the spatial phase modulator 300 receives two distinct parallel beams, $FI_1$, $FI_2$, which are from the Wollaston prism and therefore have orthogonal linear polarization directions. The coherent shaping (amplitude and phase modulation) is then done independently on these two beams with the spatial phase modulator 300 divided into two areas (see FIG. 6C) thus giving access to all the possible polarization states. On return, the two orthogonally polarized beams are recombined through the second Wollaston prism 83, symmetrical to the first, which also compensates the group delay difference introduced by the first prism (which is primarily useful for very short input pulses, with a duration less than 100 fs, and in the case where the use of thick Wollaston prisms is necessary).

It is also possible to envisage a configuration using only the first birefringent element (Wollaston prism). In this case, the spatial filtering would have to be done in the object focal plane of the lens 2 and the ejection of the beam would be done after return collimation, that is to say, to the left of the lens 1. Such a configuration poses problems of bulk and is also penalized by the effect of the group delay difference between the two polarizations. Consequently, the use of two birefringent elements is preferred.

Figure 6C:
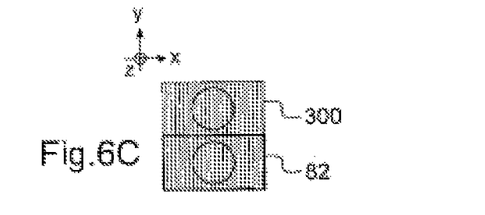

The polarization of one of the two incident beams on the phase matrix can be rotated by 90° using an additional half-wave plate 82 placed over half of the field of the spatial phase modulator. This operation makes it possible to optimize the diffraction efficiency of the spatial phase modulator without compromising the principle of operation of the apparatus. This second phase plate is passed through a second time in reverse direction after diffraction by the modulator, which makes it possible to restore the initial direction of polarization on this path.

The case of a splitting of the input beam into two beams linearly polarized in orthogonal polarization directions has been considered. It would also be possible to envisage a splitting into two beams exhibiting right and left circular polarizations; in this case, it is necessary to use a modulator in which the pixels exhibit an optical activity, for example using liquid crystals of cholesteric type. Even more generally, any splitting into two orthogonal polarization states can in theory be envisaged. However, the use of linearly polarized beams is preferred, because it is much simpler to implement.

As explained above, in order to obtain time-resolved output pulses, it is possible to separate the diffracting regions of the spatial phase modulator—generating said pulses—with non-diffracting regions, characterized by a phase shift $\Delta\varphi$ that is constant and corresponds to the intervals of zero light intensity between the pulses.

Figure 5:
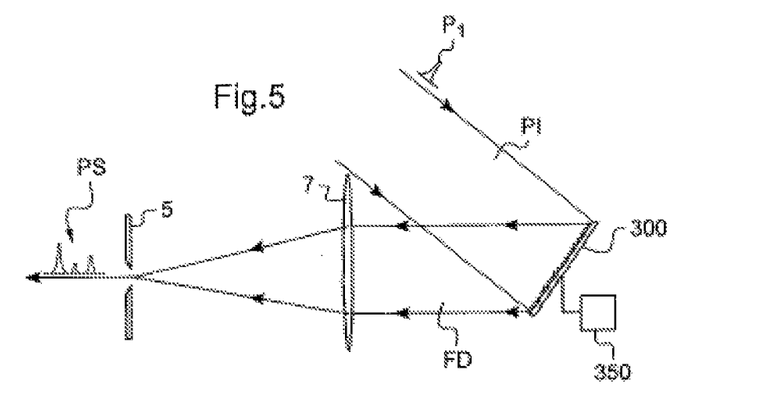
FIG. 5, the diagram of a device according to a second embodiment of the invention.

The invention has been described with reference to an example in which the phase modulator emulates a blazed grating in Littrow configuration. There is, however, absolutely no need to operate in Littrow configuration, as the device of FIG. 5 shows (the input telescope is not represented, nor is the output collimation lens 6; a lens 7 precedes the spatial filtering slot 5). The use of a blazed grating is greatly preferred, but it too is not essential.

The phase modulator used to implement the invention may be a liquid crystal modulator, such as the "Pluto SLM" device from the company Holoeye Photonics AG, whose different versions operate at wavelengths of between 420 nm (violet component of visible light) and 1550 nm (near infrared). It is also possible to use modulators of microelectromechanical type: these devices may advantageously be used for the shaping of pulses in the ultraviolet, or when the input pulse is extremely short (of the order of 10 fs or less) and, because of this, has a very wide band and a high spike intensity.

In the example of FIG. 4, three pixels (or, more specifically, columns of pixels) have been used to emulate each facet of the grating. This seems to be a minimum. A higher number of pixels may obviously be used, provided that there is a spatial phase modulator with a sufficient spatial resolution.

The lenses 1, 2, 6, 7 may be replaced with concave mirrors, notably an off-axis parabolic mirror for the lens 2. This solution may prove of interest in making the device compact and when the input pulse is extremely short, in order to avoid the dispersion introduced by the lenses. Concave mirrors, preferably used in grazing incidence mode, may also be used when the aim is to shape pulses in the extreme ultraviolet (wavelength less than approximately 100 nm); in practice, there are no lenses which are transparent to these wavelengths.

In the case of the device of FIG. 5, the lens 7 may be omitted if the phase modulator itself fulfills the focusing function. This can be obtained by using a modulator that has a concave surface, or by introducing a quadratic phase variation which emulates such a surface.

The phase modulator may also operate in transmission mode. However, operation in reflection mode is generally preferred because this makes it possible to avoid introducing the effects of chromatism, having a spatial resolution and a number of pixels that are sufficient and working in Littrow configuration.

The input pulses may be as short as possible, up to a duration of a few femtoseconds in the visible or near infrared, even a few tenths of femtoseconds in the extreme ultraviolet. Their maximum duration may reach a picosecond, even approximately 10 ps; beyond that, the implementation of the invention, without being impossible, becomes largely impractical.

The invention claimed is:

1. A device for shaping laser pulses comprising:
an input for a pulsed laser beam;
a spatial phase modulator, arranged on the path of said input pulsed laser beam to be illuminated thereby, the input pulsed laser beam having undergone no spectral dispersion prior to illumination of the spatial phase modulator;
a computer programmed for configuring said spatial phase modulator so as to emulate a diffraction grating having a diffraction efficiency which varies along a spatial direction identified by the intersection of the surface of the modulator with the diffraction plane; and
a spatial filter for a light beam diffracted by said grating;
whereby a laser pulse at the input of the device is converted into a train of individual output pulses exhibiting temporal intensity modulation, said diffraction grating being a blazed grating having lines whose blaze angle varies along said spatial direction, wherein at least some said lines have, relative to a periodic arrangement, an offset in the diffraction plane (xz) of the grating introducing a phase shift of the corresponding individual pulses, said offset being made both in said spatial direction (s) and in a direction perpendicular (x) to the plane of the grating; and
wherein the spatial phase modulator is tilted with respect to an incident direction of the input pulsed laser beam in such a way that said incident direction and the direction perpendicular to the plane of the grating lie in the diffraction plane.

2. The device as claimed in claim 1, in which said spatial phase modulator is a pure phase modulator.

3. The device as claimed in claim 1, also comprising a means for splitting the input pulsed laser beam into two input beams that are spatially separate and exhibit orthogonal polarization states, in which said computer is programmed for configuring said spatial phase modulator so as to emulate two distinct diffraction gratings having diffraction efficiencies which vary, independently of one another, along said spatial direction(s), each of said gratings being illuminated by one of said two input beams.

4. The device as claimed in claim 3, also comprising a means for recombining two output beams exhibiting orthogonal polarization states, diffracted by said two diffraction gratings.

5. The device as claimed in claim 1, in which said spatial phase modulator operates in reflection mode.

6. The device as claimed in claim 5, in which:
said computer is programmed for configuring said spatial phase modulator so as to emulate a blazed diffraction grating;
the spatial phase modulator is oriented in such a way that said blazed grating is in Littrow configuration; and
a beam splitter is provided to extract the beam diffracted by said modulator, being propagated back toward said input.

7. The device as claimed in claim 1, in which said spatial filter comprises:
a means for focusing a light beam diffracted by said spatial phase modulator, having a focal plane; and
a slot, arranged in said focal plane and oriented perpendicularly to said spatial direction.

8. The device as claimed in claim 7, in which said focusing means is chosen from:
a lens; and
the spatial phase modulator itself.

9. The device as claimed in claim 1, comprising a telescope for enlarging said pulsed beam, arranged between the input and the spatial phase modulator, making it possible to adjust the size of the beam to that of the modulator.

10. The device as claimed in claim 9, in which said telescope comprises a first and a second convergent lens, and in which:
said diffraction grating is a blazed grating operating in reflection mode, oriented so as to be in Littrow configuration;
a beam splitter is provided to extract the beam diffracted by said modulator, being propagated back toward said input, after the latter has passed a second time through said second convergent lens;
a slot, oriented perpendicularly to said spatial direction, is arranged on the path of the beam extracted by said splitter, in the focal plane of said second lens, to form said spatial filter.

11. A method for shaping laser pulses comprising the steps comprising:
configuring a spatial phase modulator so as to emulate a diffraction grating having a diffraction efficiency which varies along a spatial direction identified by the intersection of the surface of the modulator with the diffraction plane;
directing an input pulsed laser beam onto said spatial phase modulator, the input pulsed laser beam having undergone no spectral dispersion prior to illumination of the spatial phase modulator; and
spatially filtering a light beam diffracted by said grating;
whereby a laser pulse at the input of the device is converted into a train of individual output pulses exhibiting a temporal intensity and/or phase and/or polarization modulation, wherein said spatial phase modulator is configured so as to emulate a blazed diffraction grating, having lines whose blaze angle varies along said spatial direction, and at least some of said lines exhibit, relative to a periodic arrangement, an offset in the diffraction plane (xz) of the grating introducing a phase shift of the corresponding individual pulses, said offset being made both in said spatial direction (s) and in a direction perpendicular (x) to the plane of the grating; and
wherein the spatial phase modulator is tilted with respect to an incident direction of the input pulsed laser beam in such a way that said incident direction and the direction perpendicular to the plane of the grating lie in the diffraction plane.

12. The method as claimed in claim 11, also comprising a step consisting of splitting the input pulsed laser beam into two input beams that are spatially separate and that exhibit orthogonal polarization states, and in which, in said step of configuring a spatial phase modulator, said spatial phase modulator is configured so as to emulate two distinct diffraction gratings having diffraction efficiencies which vary, independently of one another, along said spatial direction(s), each of said gratings being illuminated by one of said two input beams.

13. The method as claimed in claim 12, also comprising a step of recombining two output beams exhibiting orthogonal polarization states, diffracted by said two diffraction gratings.

\* \* \* \* \*